United States Patent [19]

Mucheyer et al.

[11] Patent Number: 4,497,375
[45] Date of Patent: Feb. 5, 1985

[54] FORCE MEASURING APPARATUS MOUNTED ON TRACTOR INCLUDING HALL SENSOR DETECTING DEFORMATION OF FLEX ROD TO CONTROL TRACTOR POWER HOIST

[75] Inventors: Norbert Mucheyer, Rechtenbach; Hubertus Schmidt, Lohr, both of Fed. Rep. of Germany

[73] Assignee: Mannesmann Rexroth GmbH, Lohr, Fed. Rep. of Germany

[21] Appl. No.: 357,897

[22] Filed: Mar. 15, 1982

[30] Foreign Application Priority Data

Mar. 16, 1981 [DE] Fed. Rep. of Germany ....... 3110107

[51] Int. Cl.³ ............................................. A01B 63/112
[52] U.S. Cl. ................................... 172/10; 73/862.57; 73/DIG. 3; 172/7; 324/251
[58] Field of Search ............................. 172/4.5, 7, 9, 10; 280/446 R, 446 A; 73/852, 862.48, 862.57, 280/862.64, 862.68, DIG. 3; 324/207, 209, 251; 338/32 H

[56] References Cited

U.S. PATENT DOCUMENTS

| | | | |
|---|---|---|---|
| 3,118,108 | 1/1964 | Zoss et al. | 324/251 |
| 3,161,845 | 12/1964 | Galpin | 338/32 H |
| 3,814,188 | 6/1974 | Ahne | 172/7 |
| 4,218,626 | 8/1980 | Fukuda et al. | 338/32 H X |
| 4,254,395 | 3/1981 | Herden | 338/42 |
| 4,301,870 | 11/1981 | Carre et al. | 172/7 |

FOREIGN PATENT DOCUMENTS

| | | | |
|---|---|---|---|
| 1162597 | 2/1964 | Fed. Rep. of Germany | 73/DIG. 3 |
| 2804373 | 8/1978 | Fed. Rep. of Germany | 338/32 H |
| 55-69031 | 5/1980 | Japan | 73/862.57 |
| 447629 | 3/1968 | Switzerland | 324/207 |

Primary Examiner—Richard T. Stouffer
Attorney, Agent, or Firm—Oblon, Fisher, Spivak, McClelland & Maier

[57] ABSTRACT

A force measuring procedure and a force measuring apparatus are used to control the power hoist of an agricultural tractor. The force measuring procedure operates in such a manner that the relative displacement of a point on an elastic system is detected by at least one Hall sensor disposed on either the elastic system or on the fixed frame with the Hall sensor being located in a magnetic field with a predeterminable magnetic flux. For this the force measuring apparatus has a flex rod attached to at least one of a pair of lower hitches which indicates the bending moment, and the Hall sensor is mounted with its detector surface essentially in the primary plane of bending deformation of the flex rod and is connected to the control circuit of the power hoist. The described force measuring procedure and the force measuring apparatus operating with this procedure produce the particular advantage that the mounting of the parts needed for the apparatus becomes extremely simple, with a resulting high degree of measuring precision and operating reliability assured for the apparatus. The force measuring procedure and the force measuring apparatus can thus be used to particular advantage whenever the objective is to continuously monitor the construction elements of a mass produced mechanical system.

11 Claims, 7 Drawing Figures

FORCE MEASURING APPARATUS MOUNTED ON TRACTOR INCLUDING HALL SENSOR DETECTING DEFORMATION OF FLEX ROD TO CONTROL TRACTOR POWER HOIST

BACKGROUND OF THE INVENTION

1. Field of the Invention

The invention relates to a force or power measuring procedure for determining a force affecting a predetermined point on a mechanical system by transfer to an elastic system which can be used in a power measuring device for controlling the power hoist of an agricultural tractor.

2. Description of the Prior Art

Prior procedures used in this type of measurement operate on the basis that at certain points in the elastic system, stretch measurement stripes are applied by, for example, glue. The deformation of these stripes can be read optically or electrically. The stretch measurement stripes can only register very small distances with predetermined resolution capacity, so that as a rule either extremely complicated and expensive amplifier devices or translating devices must be used for the division of forces or for the deformation path. Furthermore, applying these stretch measuring stripes is complicated and necessitates a high level of skill and precision, otherwise balancing a measuring bridge constructed in such a manner would be difficult, thus resulting in non-linearities in the power measurement.

SUMMARY OF THE INVENTION

Accordingly, one object of the present invention is to create a power measuring procedure whereby the relative displacement of a point on the elastic system is detected by at least one Hall sensor located in a magnetic field and a power measuring apparatus wherein at least one of a pair of lower hitches support a flex rod indicating the bending moment with at least one Hall sensor, with its detector surface mounted in the plane of bend deformation of the flex rod, being connected to a control circuit of the power hoist. The highest degree of precision and operating reliability is assured, while considerably simplifying the application of the construction parts needed, when the object is to watch over construction components of a mechanical system that is mass produced.

The Hall sensor operates on the principle of detecting a static magnetic field which is altered by the shifting of a ferromagnetic material situated within its reach. This changing magnetic field causes the magnetic flow through the Hall sensor to change due to the relative movement of the ferromagnetic material, thereby provoking a varying output voltage in the Hall sensor. Recently Hall sensors have become widely used and due to the fact that they detect the path of the ferromagnetic material or body without contacts, i.e. they convert into output current, they are very insusceptible to disturbances. Application of the Hall sensor is very simple because it is only mounted once as an independently functioning unit to a reference point, and from that point on it can detect the deformations of the elastic system and it needs only to generate a static magnetic field. Installation and maintenance of the measuring system is extremely simple as a result. Thus, this procedure can also be used to great advantage in situations where, in a technical system that is mass produced, forces or deformations must be constantly monitored. This is the situation for example in the regulation of lifting force of an agricultural tractor. The present invention describes an apparatus that is designed for this type application and operates with the procedure according to the invention.

One particular advantage of the present invention is that the Hall sensor—provided a static magnetic field is present—need only be mounted to either the rear of the tractor or to a flex rod in order to be ready for use as a complete operational power measuring device. Since the flex rod is generally also the extension of the hitch axle for the bottom hitch, and the flex rod is made of ferromagnetic material, no additional add-on measures or elements are needed for the power measuring device. It is most advantageous when the Hall sensor is attached to the rear of the tractor, because in this way it is much easier to provide electrical power for the Hall sensor, the flex rod is not weakened, and it is easier to attach the Hall sensor due to the large planar surface on the rear of the tractor. By appropriately locating the static magnetic field or a magnet, the sensitivity of the Hall sensor or its pick-up capacity can be made so great that it reacts to the smallest of power changes in the lower hitch power, making it possible to much more accurately control the hoist assembly. This also makes the lower hitch power-control circuit continuous and stable.

According to another embodiment of the present invention the flex rod is securely attached by a support frame made of longitudinal profiles mounted on the tractor or by a linkage framework. This flex rod deforms under the application of lower hitch-power. This configuraton makes sure that the measuring sensor that reads the flex rod deformation does not register a measurement reading spike when the lower hitch power shifts from push to pull and vice versa. The connection play of the flex rod has, therefore, no longer any influence on the control function.

If the Hall sensor and the magnet are combined in a single mounting assembly the power measuring apparatus can be installed with minimum effort and it is ready for use immediately after installation.

By installation, the relative positioning of the magnet, the sensor-moved system, and the frame is chosen so that, with a change of the relative position between the flex rod and frame, the magnetic field lines and thus the magnetic flow through the sensor changes greatly. By changing the spatial orientation of either the magnet, the sensor, the flex rod, or the frame in relation to the other components of the measuring apparatus, the reaction of the power measuring apparatus and thus the control characteristics of the hoist assembly can be easily adapted to the particular environmental conditions for example, the ground conditions.

Since the Hall sensor already has its own power supply it is very simple to divert an adjustable power supply from this circuit for the electromagnet. This leads to the particular advantage, that, it is then extremely simple to aim the magnetic flow through the sensor, in order in this manner to be able to correct possible non-linearalities in the flow increase through the sensor by means of a relative shifting of the body relative to the frame.

If the flex rod also carries a permanent magnet, the sensitivity of the measuring system can be further increased.

According to a further feature of the present invention, one additional Hall sensor is provided whose detector surface is arranged inclined to the surface of the first Hall sensor. By this, conditions are established for exactly determining and regulating the lower hitch force not only according to magnitude but also to direction. If the Hall sensors or their output signals are adjustably coupled with the regulating circuit, the reaction of the regulation circuit can be held uniformly sensitive for all settings of the lower hitch pair.

According to another embodiment of the invention, the detector surface of the further Hall sensor lies in a horizontal plane perpendicular to the detector surface of the first Hall sensor, so that the detection of the traction force component can be done with the most complete suppression of mutual interference from the Hall sensors and thus, can be done most precisely. In this manner one achieves a potent output signal from the power measuring apparatus. In relation to the spatial attachment of the Hall sensor and the magnets there are great variation possibilities so that there is still great flexibility in the mounting of the power measuring apparatus. Also the optimally adapted measurement reading is provided for the particular marginal conditions, for example the hitch geometry of the lower hitch.

If the spatially separated Hall sensors are separately adjustable relative to their corresponding reference magnets, the controlled position of the lower hitch can be varied and adjusted within a wide range.

It is also a further object of the present invention to provide that the lower hitch forces not be added but rather read separately as exactly as possible. The invention solves this problem by providing a separate flex rod for each lower hitch, the deformation of each flex rod being detected by at least one Hall sensor. The flex rod construction in this case can be performed in the same manner as in the case where a single flex rod is provided for both lower hitches.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
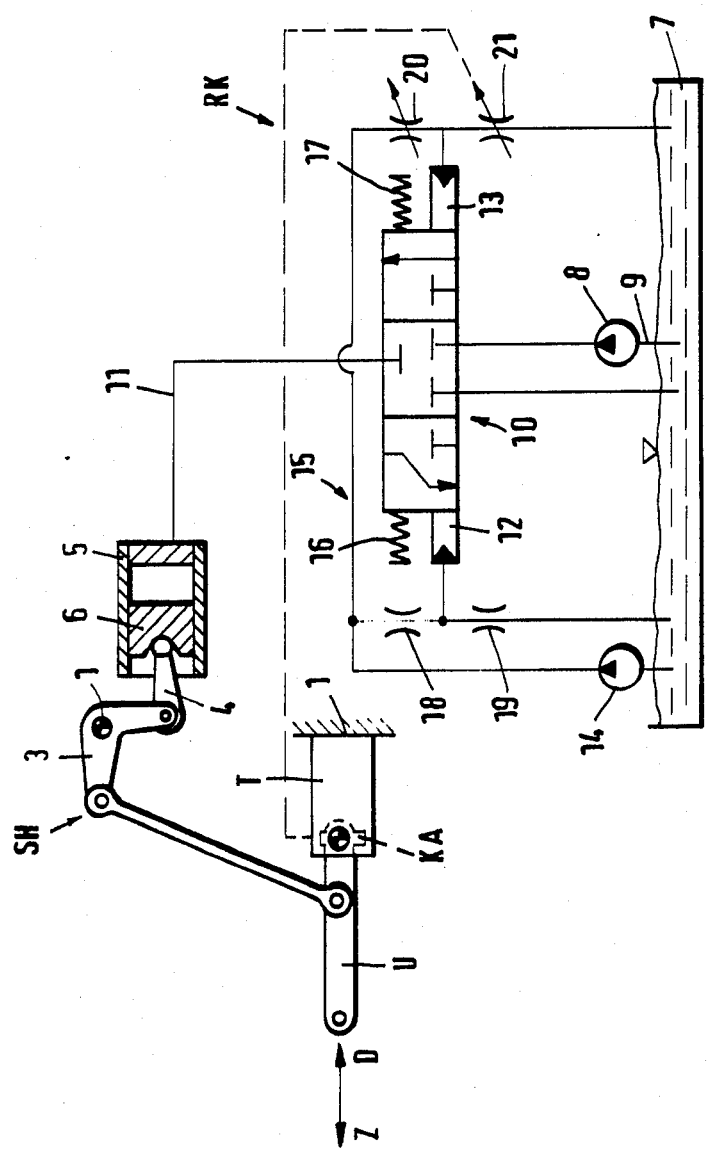
FIG. 1 shows a hydraulic circuit diagram of a control circuit for controlling the traction force in the lower hitches of a hydraulically activated hoist mechanism of a tractor.

Referring now to the drawings, wherein like reference numerals designate identical or corresponding parts throughout the several views, and more particularly to FIG. 1 thereof, there is shown a hydraulic control circuit for controlling the pull or push force Z or D in the lower hitch U of a tractor hoist mechanism SH. A lower hitch U is linked with its one end by a support frame T to the tractor 1 and by a hoist drive consisting of a hoist hitch 2, angled arm 3 and push rod 4 with a hydraulically activated power cylinder 5. The other end of the lower hitch U is connected to a power or working apparatus, f.e. a plow, whose power (pulling power) is proportional to the plowing depth, i.e. to the position of the lower hitch U. In order to hold the plowing depth constant, the power cylinder 5 is controlled by a valve 10 which is integrated into a control circuit RK, which also operates hydraulically. It is also conceivable, however, to have a control circuit that operates electrically and which displaces the valve by means of servomotors, e.g. the power piston is controlled directly by electrical means, so that the control system is no longer dependent on the tractor's hydraulics.

In the illustrated case the power cylinder 5 is fed with pressure fluid from a supply container 7 by way of a power feed line 11. A power pump 8 for this purpose sucks pressure fluid through a suction line 9 and pumps it through the directional control valve 10 to the power cylinder 5, where it performs work by displacing a hoist piston 6.

The directional control valve 10 is controlled by a control-pressure circuit having bilaterally situated control devices 12 and 13. The control-pressure circuit has a control pump 14, which supplies the control circuit with pressure fluid through a line network 15. The directional control valve 10 is held in the illustrated middle position by a set of control springs 16 or 17 when the control devices 12 or 13 are not operating. On the side of the directional control valve 10 there is pressure established by two stationary throttles or jets 18 or 19. The pressure on the other side of the directional control valve 10 is determined by a pressure drop at the two variable chokes 20 or 21. Choke 20 functions as a set valve generator and the choke 21 as an actual valve sensor of the control circuit. The choke 21 is connected mechanically, electrically or hydraulically (shown by RK) with a force detector KA for the lower hitch, so that this coupling can serve as a feed back path for the control circuit.

The illustrated position represents the controlled position of the directional control valve 10. The choke 20 determines the height of the lower hitch. The pulling force Z, or the pushing force D on the lower hitch U is at a value that the pressure between the two chokes 20 and 21 corresponds to the pressure between the two stationary jets 18 and 19.

When, for whatever reason, the power on the lower hitch deviates from the adjusted valve, for example, when the plow digs too deeply into the earth when passing over a hump, the choke cross section of the actual valve sensor (choke 21) changes, and the pressure acting on the control device 13 increases. Since the pressure at the side of the control device 12 is constant, the directional control valve 10 is pushed into a position in which the pressure fluid is pumped into the power cylinder 5, so that the lower hitch U is raised by the hoist drive. The power on the lower hitch U is thus lessened and the choke 21 is slightly opened again, so that a new equilibrium is established in which the power on the lower hitch is readjusted and the position of the lower hitch is changed.

Figure 2:
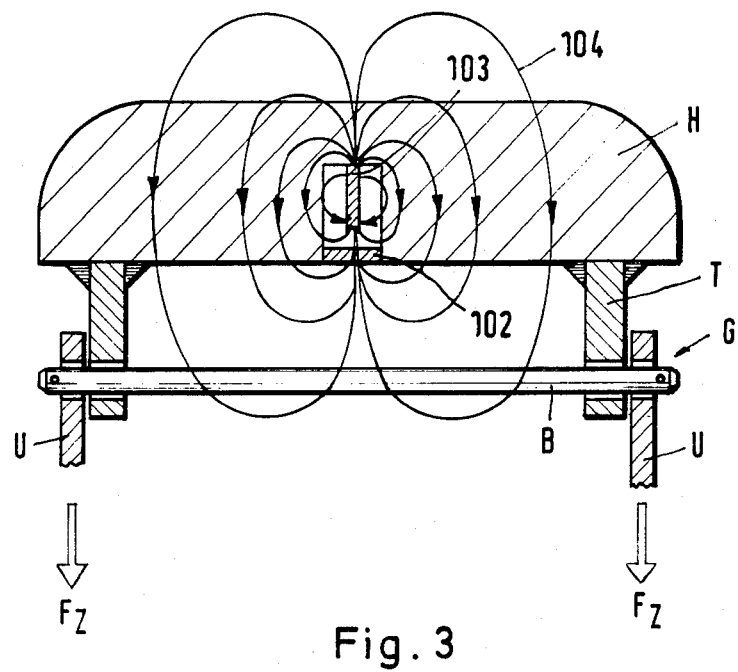
FIG. 2 shows a schematic cut-away horizontal projection onto the rear of an agricultural tractor with an installed power measuring apparatus.

FIG. 2 shows the construction of a device for generating a set value for the choke valve of the control circuit which is proportional to the pulling force in the lower hitches. The device is constructed symmetrically and shows two lower hitches U which are linked at a joint G that is formed by a flex rod B which is born on both sides in support plates T. The support plates are securely fixed to the rear H of the agricultural tractor. The power measuring apparatus 100 is mounted on the rear H of the tractor symmetric to the joint position G in this illustrated embodiment. The power measuring apparatus consists of a Hall sensor 102 and a magnet 103. Magnet 103 may be either a permanent magnet or an electromagnet with power supply. The power measuring apparatus is locally attached to the rear H of the tractor. FIG. 2 shows magnetical field lines 104 which pass through the Hall sensor 102 with a certain intensity. The magnetic field determined by the magnetic field lines 104 and stabilized in the illustrated embodiment is affected by the material selected for the rear of the tractor H and the flex rod B. One notices that the flex rod B is located in the magnetic field 104.

Some of the magnetic field lines 104 pass through the Hall sensor 102, which generates a certain output signal which is read in order to control the hoist. If a greater pull force $F_Z$ is applied to the lower hitch U, the flex rod B deforms in one direction relative to the Hall sensor 102, causing a shift in the magnetic field lies 104. This in turn causes a change in the magnetic flux intensity passing through the Hall sensor 102, so that the output signal of the Hall sensor 102 changes in dependence on bending deflection, i.e. in dependence on the pulling force on the lower hitches U. By moving the Hall sensor 102 in relation to the magnet 103 when magnet 103 is a permanent magnet, the output signal of the Hall sensor 102 can be adjusted. When magnet 103 is an electromagnet with power supply, adjustment of the magnet is achieved by adjusting the power supply.

Figure 3:
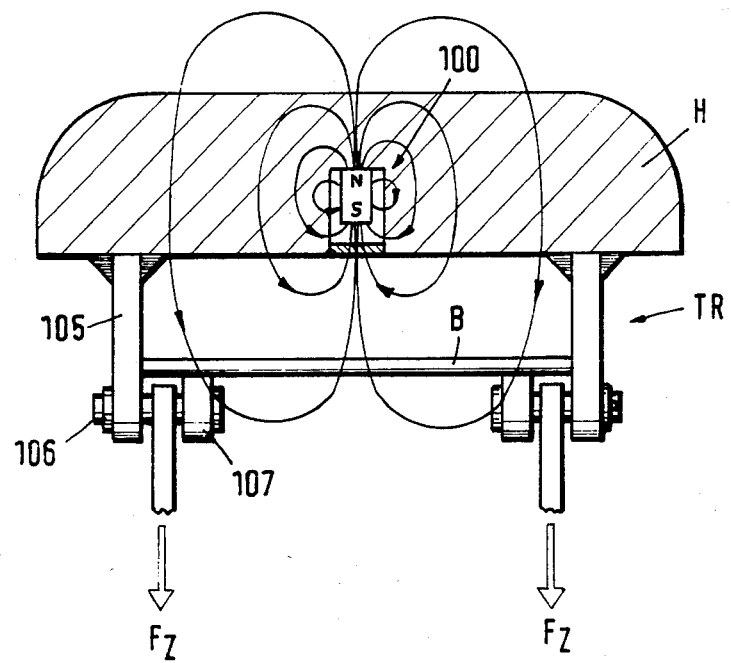
FIG. 3 shows a view similar to that in FIG. 2 of a further embodiment of the power measuring apparatus.

FIG. 3 shows another embodiment of the power measuring apparatus. The apparatus in this embodiment exhibits a support frame TR made of two longitudinal profiles 105 that are disposed parallel to each other and extend in the travel direction of the tractor and are attached to the rear H of the tractor. The flex rod B, which is welded to the hitch profile, 105 exhibits a strut of a thus closed frame. The logitudinal profiles 105 extend somewhat above and beyond the flex rod B and each receive in these protruding sections a bolt 106, which each pass through another support plate 107 which is rigidly attached to the flex rod B, e.g. welded to it. Each lower hitch U is attached by way of the bolts 106. The closed frame deforms elastically and symmetrically under a load on the lower hitches U, whereby the flex rod B undergoes the greatest deformation. This deformation displacement is sensed by the power measuring apparatus 100, which is mounted on the tractor rear H, as previously shown in FIG. 2.

Figure 4:
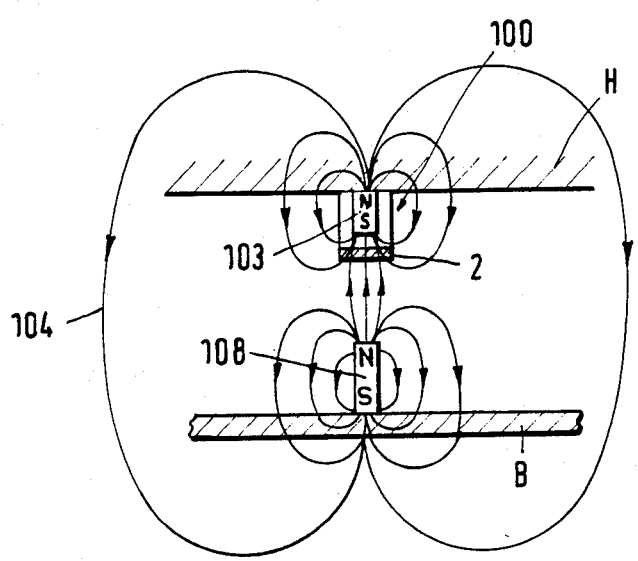
FIG. 4 shows a partial view of a third embodiment of the power measuring apparatus in the non-stressed condition of the flex rod.
Figure 5:
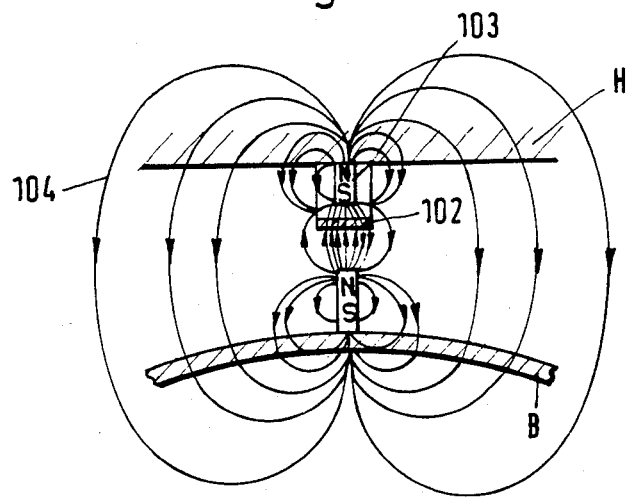
FIG. 5 shows a view similar to that in FIG. 4 of the power measuring apparatus illustrated in FIG. 4 in the stressed condition of the flex rod.

FIGS. 4 and 5 show an embodiment in which an additional permanent magnet 108 is associated with the measuring apparatus 100. This magnet is attached, e.g. by screws or glue, to the flex rod B. FIG. 4 and 5 illustrate how as a result of the deformation of the flex rod B the path of the magnetic field lines 104 is altered so that the Hall sensor 102 is increasingly affected by the magnetic field lines 104 as the flex rod B is increasingly deformed. The result is an output signal generated by the Hall sensor 102 that increases greatly with the bending deformation of the rod B.

Of course electromagnets can be used in the place of the permanent magnets shown in FIG. 3 through 5. Their magnetic flux must necessarily be kept constant. It is also possible to arrange several magnets in such a manner that their magnetic field lies increasingly overlap at a predetermined point as the relative displacement of the flex rod to the rear of the tractor increases so that the Hall sensor 102 can be place in this point of overlap.

Figure 6:
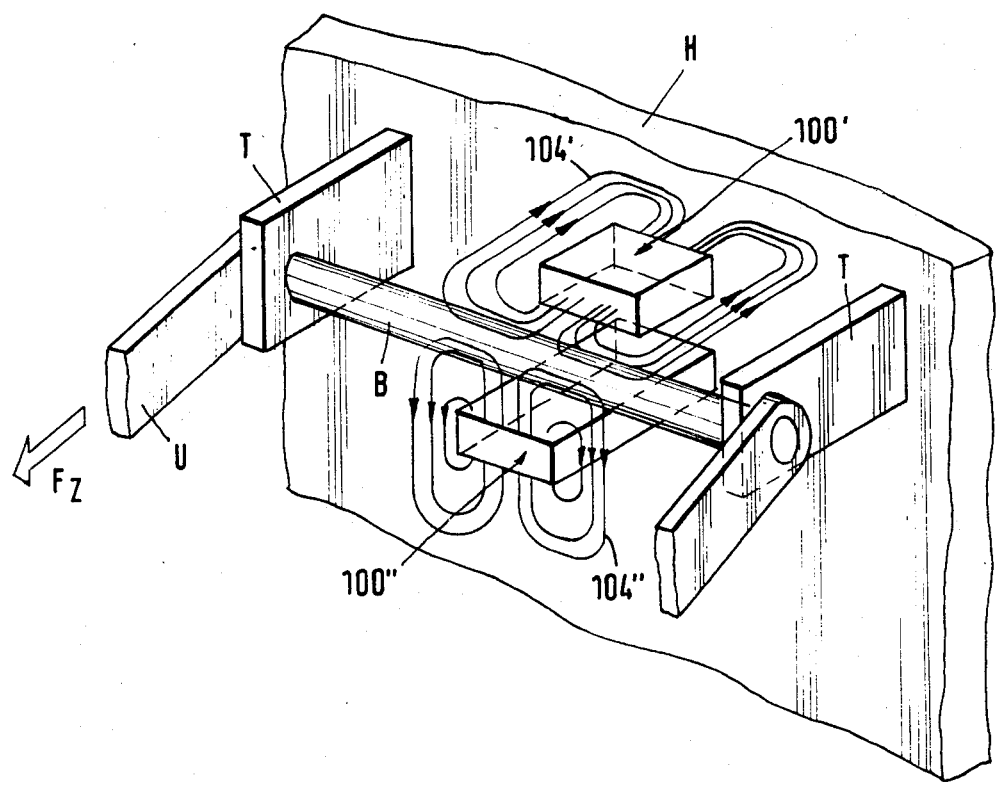
FIG. 6 shows a perspective view of a rear of an agricultural tractor with a mounted additional embodiment of a power measuring apparatus.

FIG. 6 shows a perspective view of the rear H of the tractor with the supports T attached to it an a flex rod B held therein to which the lower hitches U are connected. Two measuring apparatus 100' and 100" are attached to the tractor rear H. Each of these receive a non-illustrated Hall sensor whose detector surfaces lie in mutually perpendicular planes and are penetrated by the magnetic field lines 104' and 104". Measuring apparatus 100" is constructed similarly to the measuring apparatus in FIG. 2 through 5, and it detects the bending of the flux rod B in a vertical direction. The measuring apparatus 100", whose Hall sensor is aligned so that its detector surface lies in a vertical plane, detects the bending of the flex rod B in the horizontal direction. Thus the power measuring apparatus 100' detects horizontal and power measuring apparatus 100" vertical lower hitch forces $F_Z$. Power measuring apparatus 100' and 100" are preferably mounted on the tractor rear H so that the magnetic field lines do not affect each other. To measure lower hitch forces in several directions, all of the embodiments of the force measuring apparatus illustrated in FIG. 2 through 5 can be used.

Figure 7:
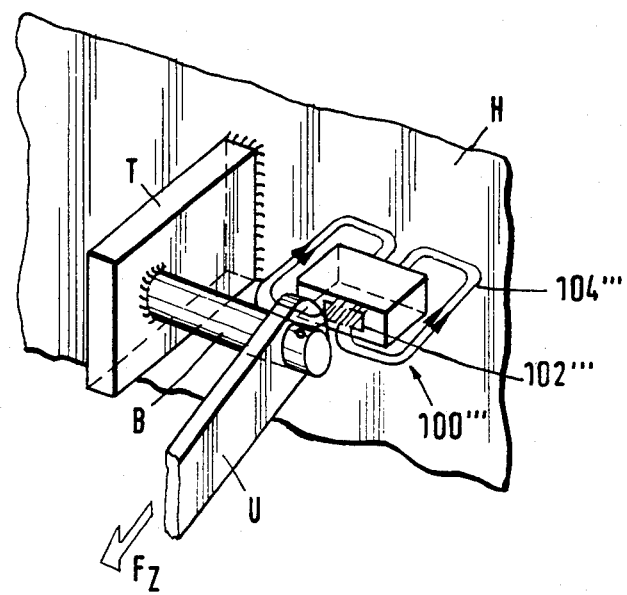
FIG. 7 shows a view similar to that in FIG. 6 of an additional embodiment of a power measuring apparatus.

FIG. 7 shows a force measuring apparatus 100''' which reads only lower hitch force $F_Z$. In this embodiment the flex rod B is welded to the support T, and the force measuring apparatus 100''' registers each displacement of the lower hitch U. Of course nothing associated with separate monitoring of lower hitch forces limits one to this embodiment. It is also possible to associate a separate flex rod with each lower hitch U. If the direction of the lower hitch forces is also to be detected, only one (not shown in FIG. 7) additional force measuring apparatus needs to be mounted in a suitable position. Care must be taken, however, that the magnetic field lines 104''' do not affect each other too much. It is particularly advantageous if the force measuring apparatus are individually adjustable, because the soil treating devices that are attached to the tractor hoist mechanism often do not exert symmetrical forces on the tractor. These processes of adjusting the force measuring apparatus are then particularly simple, and thus very few operations are needed to set the optimal lower hitch force and the optimal lower hitch force direction that are adapted to the given soil treating device.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A force measuring apparatus mounted on an agricultural tractor with a power hoist, said force measuring apparatus for controlling said power hoist wherein the force affecting a point on said power hoist is transferred to an elastic system which is elastically deformed, comprising:
- a flex rod subjected to a bending moment introduced by a pair of lower hitches wherein said flex rod indicates a bending moment said lower hitches forming part of said power hoist;
- at least one Hall sensor having its detector surface intersecting the plane of the main bend deformation of said flex rod in a region of maximum deflection thereof wherein the longitudinal axis of said rod is in said plane; and
- a control circuit connected to the output of said Hall sensor for controlling said force; wherein
- said Hall sensor is combined with a first magnet to form a single unit component securely attached to the rear of said tractor and spaced from said flex rod in such a way that the magnetic field lines starting from the magnet and going through the Hall sensor substantially exclusively lie in the plane of the bend deformation to be measured.

2. Apparatus according to claim 1 wherein said Hall sensor is disposed symmetrically to the hitch points (G) of the lower hitches (U) on said tractor (H).

3. Apparatus according to one claim 1, wherein said flex rod (B) is rigidly coupled to a support frame (TR) that is securely mounted to the rear (H) of the tractor, with the force ($F_z$) exerted on said lower hitches (U) being received by the bending deformation of said flex rod.

4. Apparatus according to claim 1, wherein said first magnet is a permanent magnet.

5. Apparatus according to claim 1, wherein the distance of the magnet from the Hall sensor is adjustable.

6. Apparatus according to claim 1, wherein the magnet is an electromagnet, whose power supply is adjustable.

7. Apparatus according to claim 1, wherein the flex rod supports a permanent magnet, whose field lines pass through the Hall sensor.

8. Apparatus according to claim 1, further comprising at least one additional Hall sensor whose detector surface arranged at an angle to that of the first Hall sensor.

9. Apparatus according to claim 8, wherein said detector surface of said additional Hall sensor lies in a horizontal plane and is disposed perpendicular to the detector surface of said first Hall sensor.

10. Apparatus according to one of claims 8 or 9, wherein both Hall sensors are individually adjustable relative to the given magnetic field passing through them.

11. Apparatus according to claim 1, wherein a flex rod is associated with each lower hitch, the respective bend deformation of each flex rod being detectable by at least one Hall sensor.

* * * * *